United States Patent
Azbel et al.

(10) Patent No.: US 11,322,183 B2
(45) Date of Patent: *May 3, 2022

(54) AUTOMATED VIDEO GENERATION FROM FINANCIAL MARKET ANALYSIS

(71) Applicant: AUTOCHARTIST LIMITED, Engomi (CY)

(72) Inventors: Ilan Azbel, Austin, TX (US); Kobus Steenekamp, Johannesburg (ZA); Jan Van Der Westhuizen, Alberton (ZA)

(73) Assignee: AUTOCHARTIST LIMITED, Engomi (CY)

( * ) Notice: Subject to any disclaimer, the term of this patent is extended or adjusted under 35 U.S.C. 154(b) by 126 days.

This patent is subject to a terminal disclaimer.

(21) Appl. No.: 16/926,406

(22) Filed: Jul. 10, 2020

(65) Prior Publication Data

US 2020/0342911 A1    Oct. 29, 2020

Related U.S. Application Data

(63) Continuation of application No. 16/136,283, filed on Sep. 20, 2018, now Pat. No. 10,783,928.

(51) Int. Cl.
*H04N 5/93* (2006.01)
*G11B 27/00* (2006.01)
(Continued)

(52) U.S. Cl.
CPC .............. *G11B 27/06* (2013.01); *G06F 40/58* (2020.01); *G06Q 40/04* (2013.01); *G10L 13/00* (2013.01)

(58) Field of Classification Search
USPC ................................................ 386/248, 278
See application file for complete search history.

(56) References Cited

U.S. PATENT DOCUMENTS 6,820,055 B2    11/2004    Saindon et al.
9,443,518 B1     9/2016    Gauci
(Continued)

FOREIGN PATENT DOCUMENTS

WO    WO2006069445 A1    7/2006
WO    WO2016157150 A1    10/2016

OTHER PUBLICATIONS

MetaView lets you view the stock market in 3D, Oct. 17, 2008, Peter Cohen, Macworld From IDG. https://www.macworld.com/article/1136205/metaview.html. Downloaded from the internet on Jul. 10, 2020 at 4:10 PM.

*Primary Examiner* — Nigar Chowdhury
(74) *Attorney, Agent, or Firm* — The Jansson Firm; Pehr B. Jansson (57) ABSTRACT

Production of a financial market trading data video streams in a plurality of languages by receiving a financial market analysis result having an analysis type. Producing a sentence text-string corresponding to each of several languages by inserting characteristic information values from the financial market analysis result into a sentence template and translations of the sentence-template. The each said text string is converted into an audio segment and an image segment such that the audio segment and corresponding image segment have equal duration. A video segment is created by combining said audio segment and image segment. For each language of said plurality of languages, the video segments are stitched together thereby producing a financial market trading data video stream for said financial market analysis result.

21 Claims, 8 Drawing Sheets

(51) Int. Cl.
*G11B 27/06* (2006.01)
*G06Q 40/04* (2012.01)
*G06F 40/58* (2020.01)
*G10L 13/00* (2006.01)
*H04N 9/80* (2006.01)

(56) References Cited

U.S. PATENT DOCUMENTS

| | | |
|---|---|---|
| 9,607,611 B2 | 3/2017 | Dayan et al. |
| 9,678,953 B2 | 6/2017 | Waibel |
| 10,592,310 B2 * | 3/2020 | Li .................. G06F 16/9535 |
| 2006/0285654 A1 | 12/2006 | Nesvadba et al. |
| 2007/0118394 A1 * | 5/2007 | Cahoon .................. G06Q 50/01 |
| | | 705/1.1 |
| 2009/0204402 A1 | 8/2009 | Marwaha et al. |
| 2010/0324936 A1 * | 12/2010 | Vishnubhatla .......... G16Z 99/00 |
| | | 705/3 |
| 2011/0231353 A1 * | 9/2011 | Wang ..................... G06Q 10/10 |
| | | 706/45 |
| 2012/0052930 A1 * | 3/2012 | McGucken ............. A63F 13/47 |
| | | 463/1 |
| 2013/0230830 A1 * | 9/2013 | Liu ......................... G09B 5/00 |
| | | 434/156 |
| 2014/0181178 A1 * | 6/2014 | Sahoo ..................... G06F 9/505 |
| | | 709/203 |
| 2015/0213793 A1 | 7/2015 | Phelan et al. |
| 2017/0083714 A1 | 3/2017 | Keiser et al. |
| 2017/0124741 A1 | 5/2017 | Campbell et al. |
| 2018/0285840 A1 * | 10/2018 | Hasan .................. G06F 15/177 |

* cited by examiner

"Today's latest FOREX Report, January 31, 2018. Swiss Franc."

*Fig. 4(a)*

"Channel down identified on January 31st at 7 o'clock."

*Fig. 4(b)*

"Possible bearish price movement toward support at 0.9288 within the next three days."

AUTOMATED VIDEO GENERATION FROM FINANCIAL MARKET ANALYSIS

BACKGROUND OF THE INVENTION

The present invention relates, generally, to financial market analysis presentation, and more particularly to automated video production from financial market analysis results.

Exchanges for trade in financial instruments, such as stock exchanges, futures exchanges, and currency exchanges (FOREX), collect and distribute enormous quantities of financial instrument trading data. This data includes trading prices and volumes for every trade made on the exchange. Typically, the trading prices are presented to investors in a graphical form over some period of time.

Investors and speculators attempt to forecast prices by analyzing historical trends. Furthermore, there are automated tools for performing such analysis. Autochartist, Limited, Nicosia, Cyprus provides a suite of analysis tools for analyzing such data to enable investors to make use of past trading information for this purpose.

In the field of financial markets (for trading and investment purposes), market commentary and forecasts are primarily performed by either human analysts or computers. Financial market analysts may from time-to-time present market analysis commentaries, which provide traders with some insights based on past trading activity to allow traders to make trading decisions based on such market commentary. Human analysts produce unstructured analysis that result in written documents, emails, web pages and blog posts. Computer models can also create market commentary but in the form of highly structured information that are stored in predefined database structures.

Because of the massive connectivity between financial markets, borders do not restrict where traders trade. For example, a person in France can easily trade on the New York Stock Exchange, and a person residing in the USA can easily trade on Borsa Istanbul located in Turkey. Furthermore, many traders have started to consume information through mechanisms other than written text. For example, many traders of a younger generation favor receiving information via audio and video in the form of podcasts or video presentations.

The cross-border trade and multi-media information consumption mean that human market commentators are:
- pushed to produce content in multiple languages to cater to audiences in different parts of the world
- required to provide content 24 hours per day to trading hours for different exchanges around the world
- need to deliver content in formats that are more broadly accepted and efficient from a consumer's perspective Analysis providers who use computerized mechanisms to produce financial instrument trading analysis are:
- limited to creating content that is highly structured and typically displayable in visual structures like tables made up of rows and columns; i.e., a very formal and impersonal way of communicating information To address these issues has hitherto been solved using human resources. Financial institutions attempt to provide financial instrument analysis commentary by:
- recruitment of language-specific industry professionals that produce market commentary specifically for each language
- recruitment or outsourcing of translation services
- recruitment of creative teams that create and edit video content along with voice-over artists to cater for multi-language scenarios The above solutions are very costly and inefficient and fail to address the desire of providing 24-hour multi-language coverage for a vast array of financial instruments because humans cannot work 24 hours per day, there are too many languages in the world to be able to perform these services for everyone, and humans cannot produce content at the scale and speed that is required by modern high-speed financial markets.

From the preceding, it is apparent that there is a need for an improved method to provide automated production of financial instrument commentary videos for dissemination to users in mechanisms consistent with user preferences for receiving and consuming information.

SUMMARY

A system and method produces a financial market trading data video stream by receiving a financial market analysis result having an analysis type. Based on the analysis type, selecting a plurality of sentence templates corresponding to the analysis type from a set of sentence templates, wherein a sentence template is a combination of at least one text string and at least one characteristic-information variable. Translations of the selected plurality of sentence templates for a plurality of languages are retrieved and for each language, the system and method operates to substitute characteristic-information data from said financial market analysis result for each said characteristic-information variable, thereby producing a sentence text-string corresponding to said each language and said translation of the selected sentence-template. The each said text string is converted into an audio segment and an image segment such that the audio segment and corresponding image segment have equal duration. A video segment is created by combining said audio segment and image segment. For each language of said plurality of languages, the video segments are stitched together thereby producing a financial market trading data video stream for said financial market analysis result.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following detailed description includes description of computer programs and computer-executable methods. A person skilled in the art realizes that while such programs and methods may be described using shorthand terminology that indicates that the programs or subprograms thereof perform certain actions, such actions are executed by a processor of a computer executing instructions of such computer programs. Thus, a person skilled in the art would interpret a statement such as "module X performs action Y" as "a processor of a computer Z interprets instructions of module X to execute action Y."

In an embodiment, a technology is provided in which financial market commentary videos in multiple languages are produced automatically. These videos are created in such a way that audio and video images flow naturally regardless of language.

Definitions

Financial Instrument Analysis—one of or a combination of:

Technical Analysis—an exercise of pattern recognition or arithmetic analysis of price movements in the trading prices of a financial instrument designed to discover patterns in the trading of the financial instrument that may be used to forecast future price movements.

Statistical Analysis—the process of describing the price movement of financial instruments in the form of statistical probability distributions, thereby allowing one to describe the dynamics of the financial instrument.

Macroeconomic Analysis—the process of investigating how macroeconomic events affected the price of financial instruments in the past and using these models to forecast how these same macroeconomic events may affect prices of the financial instrument in the future.

Fundamentals Analysis—the process of valuing a company with respect to the financial information contained in a company's current and historical balance sheets, income statements and cash flow statements.

Volatility and Risk Analysis—calculations that describe the financial risk being taken when acquiring a financial instrument. These calculations are primarily based on the historical and expected volatility of the financial instruments.

Financial Instrument Analysis accepts a data stream of financial instrument data and produces an analysis result. Autochartist Limited of Nicosia, Cyprus provides automated tools for performing above-described Financial Instrument Analysis.

Analysis Result—the output of a Financial Instrument Analysis. An analysis result is defined by pieces of characteristic information. Example listings of characteristic information is provided in Appendixes A through C.

Characteristic information—Information associated with an analysis result and which identifies the analysis result and provides values and observations in regard to the analyzed trading data.

Visual element—a static element that forms a part of a digitized image, e.g., a symbol for a financial instrument, a graph of trading values for the financial instrument, lines and other graphics that correspond to an analysis result discovered through a financial instrument analysis.

Image segment—a sequence of digitized images that are substantially the same such that when played through a video playback device, the produced image is static; typically used to introduce a single visual element. In some embodiments, an image segment may be a sequence of closely related digitized images forming an animation.

Text segment—a textual description associated with an image segment. Any given image segment may have more than one text segment associated therewith so that descriptions of image segments varies.

Audio segment—digitized audio, which, when played back through an audio playback device, produces sound. An audio segment may be generated from a text segment.

Video segment—an image segment and a corresponding audio segment; typically to introduce visually a single visual element and associated audio description related to that single visual element.

Video stream—a sequence of video segments (image and audio streams).

Analysis video stream—a video stream corresponding to one analysis result containing video segments, each corresponding to a visual component describing the analysis result.

Figure 1:
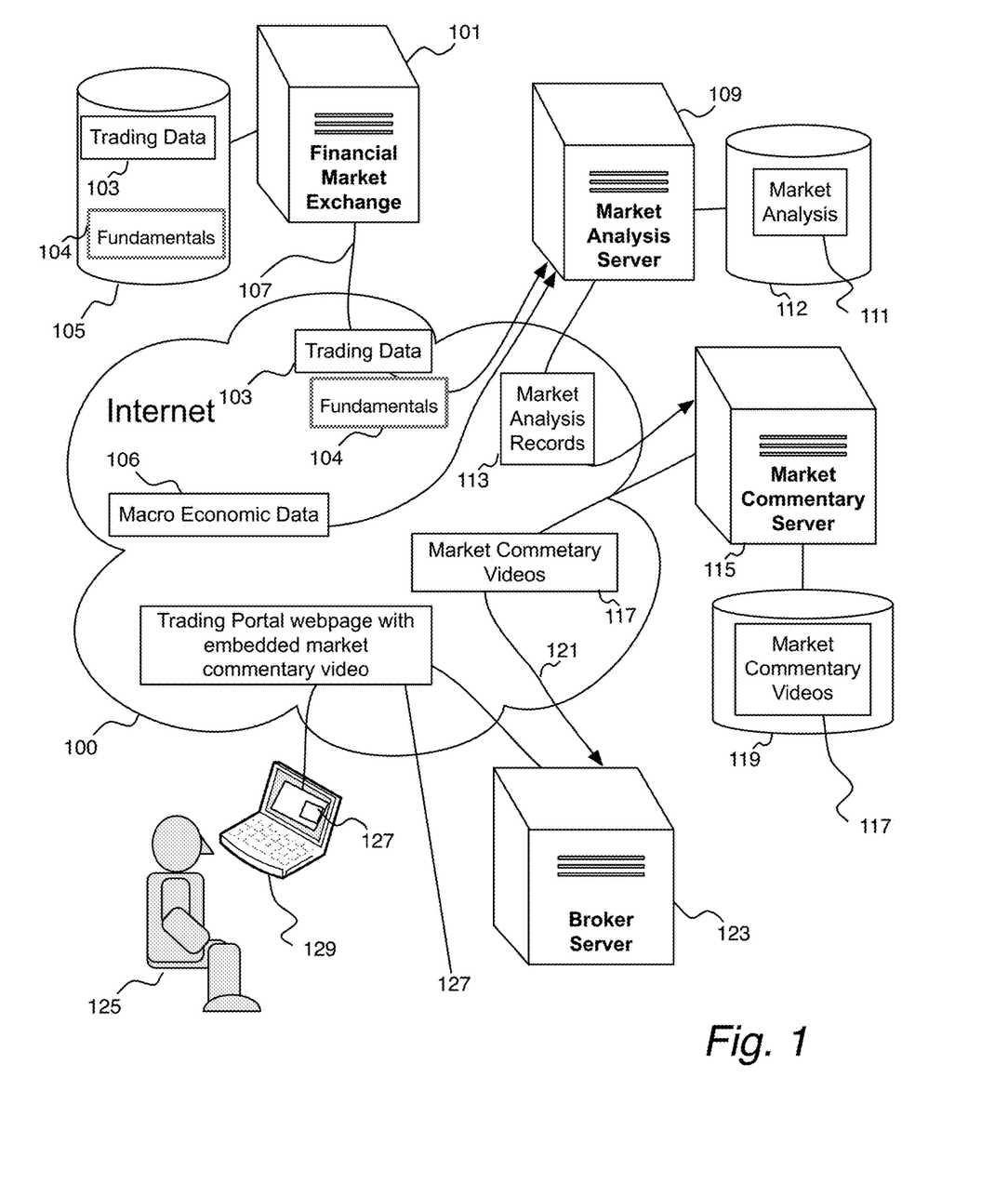
FIG. 1 is a network diagram.

FIG. 1 is a network diagram illustrating a system and method for automatic production of multi-language financial market analysis videos and delivery thereof over a network 100, e.g., the Internet.

Financial instruments (e.g., stocks, bonds, mutual funds, foreign exchange, commodities) are commonly traded on a financial market exchange 101 (e.g., a stock exchange) or in over-the-counter trades (while over-the-counter trades are not performed on an exchange, "exchange" is used here broadly to include mechanisms for facilitating such trades). The exchange 101 collects vast amount of trading data 103 (e.g., completed trades, bids and asks, including volume and pricing information). The exchange 101 may store the trading data 103 in a exchange-data database 105. The exchange may further store "fundamentals" data 104 such as revenue, earnings, assets, liabilities, and growth, for example, from company financial statements in the exchange-data database 105. The trading data 103 and fundamentals data 104 (or a subset of either) may be supplied 107 to a market-analysis server 109.

The market-analysis server 109 may further be supplied with macroeconomic data 106. The macroeconomic data 106 may include such items as unemployment data, national or regional growth data, interest rates, and taxation rates.

The macroeconomic data 106 may be obtained from various sources, e.g., government statistics sources, central banks.

The market-analysis server 109 performs one or more categories of market analysis from the trading data 103, macroeconomic data 106, and fundamentals data 104 that it receives from the exchange 101 and other sources. These analysis categories include, but are not limited to, technical analysis, statistical analysis, macroeconomic analysis, fundamental analysis, as well as volatility-and-risk analysis. The market-analysis results 111 are stored, for example, in a market-analysis database 112.

Figure 2:
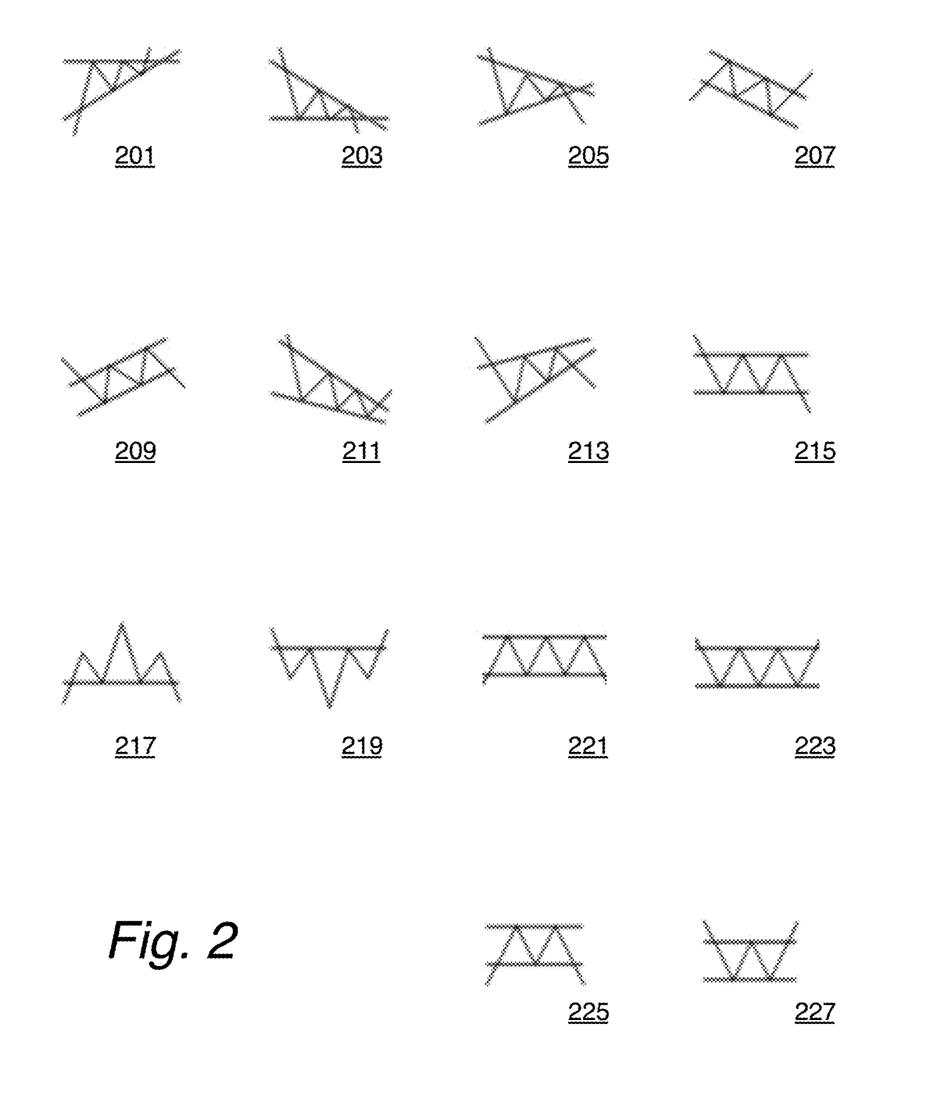
FIG. 2 contains illustrations of typical patterns that technical analysis seeks to find in trading data

Technical analysis, used here as an example, is an analysis that identifies patterns from the trading data. FIG. 2 contains illustrations of typical patterns that technical analysis seeks to find in trading data:

Triangles 201, 203, 205
Rising and Falling Channels 207, 209
Rising and Falling Wedges 211, 213
Head-and-Shoulders 217, 219
Triple Tops and Bottoms 221, 223
Double Tops and Bottoms 225, 227

Figure 3:
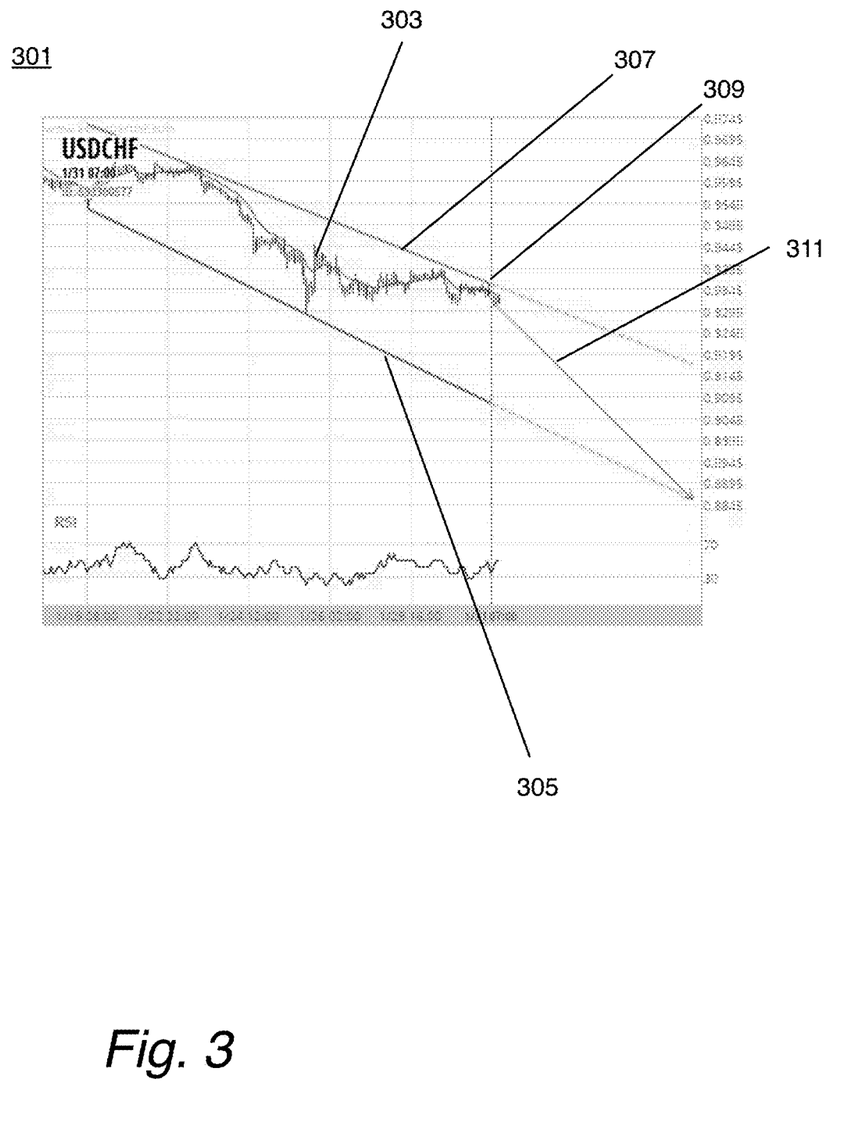
FIG. 3 is an example illustration of a technical analysis result.

FIG. 3 is an example graphical illustration 301 of a technical analysis output wherein a descending channel 307 has been detected for the exchange data 303 of Swiss Franc (CHF) for US Dollars (USD). The technical analysis has determined a descending support level 305 and a descending resistance level 307. These are on essentially parallel trajectories, thus forming a channel.

The technical analysis has further determined that the trading price has turned away from (at location 309) the resistance level and is trading at 0.928. There is a downward trend, which may foreshadow trading prices to decrease 311 towards the descending support level 305. Thus, a future exchange rate consistent with the extension of the support 305 may be predicted.

While FIG. 3 provides a graphical illustration for a technical analysis, the analysis results may be stored in a database, e.g., as shown FIG. 1 market-analysis database 111. Appendix A provides a list of database fields, referred to herein as pieces of characteristic information, that may be used in an embodiment to describe analysis results. For illustrative purposes, a subset of characteristic information fields and values are used in the description below. This subset corresponds to the analysis result illustrated in FIG. 3:

TABLE 1

Characteristic Information corresponding to the technical analysis of FIG. 3.

| FIELD | VALUE |
| --- | --- |
| Symbol | USDCHF |
| Pattern | Channel |
| Direction | Down (−1) |
| PatternEndTime | Jan. 31, 07:00 |
| Trend | Bearish towards support |
| Supportx0 | 2018 Jan. 19 03:00:00 |
| Supportx1 | 2018 Jan. 25 10:00:00 |
| Supporty0 | 0.9533 |
| Supporty1 | 0.9288 |
| Resistancex0 | 2018 Jan. 23 04:00:00 |
| Resistancex1 | 2018 Jan. 31 00:00:00 |
| Resistancey0 | 0.96335 |
| Resistancey1 | 0.93584 |
| PredictionPriceFrom | 0.928 |
| PredictionTimeFrom | Jan. 31, 07:00 |
| PredictionTimeTo | Feb. 3, 07:00 (within next three days) |

Returning now to FIG. 1, the market-analysis server 109 may transmit market analysis records 113, which may be a subset of records stored in the market-analysis database 111, to a market-commentary server 115.

The market-commentary server 115 receives the market-analysis records 113 and using filtering criteria produces market-commentary videos 117 corresponding to the market-analysis records 113.

A market-commentary video 117 is a video stream in which various concepts of a market analysis are displayed sequentially. For example, for the market analysis of FIG. 3 may be broken up into an image and audio sequence illustrated in FIGS. 4(a)-4(c).

Figure 4A:
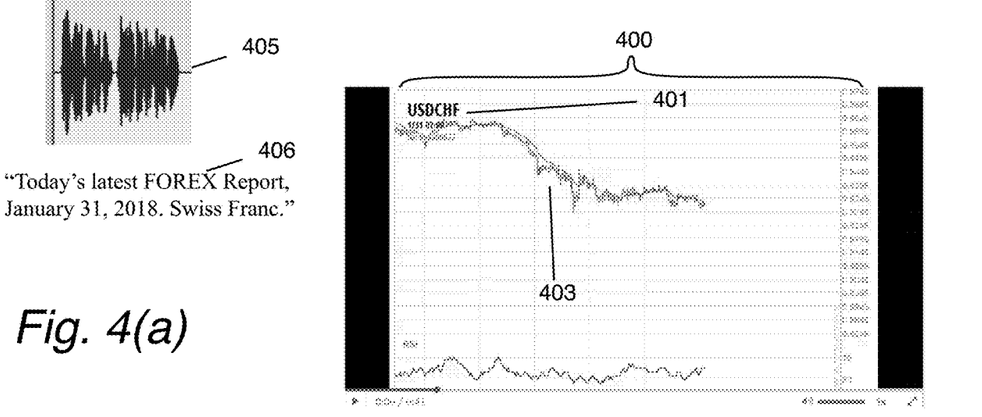
FIGS. 4(a) through 4(c) provide an example of a market analysis video produced from technical analysis of a trading data of a financial instrument.
Figure 4B:
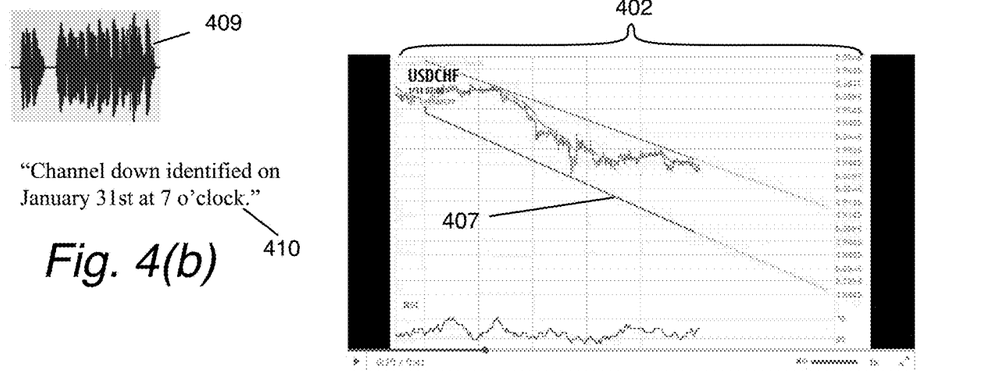
Figure 4C:
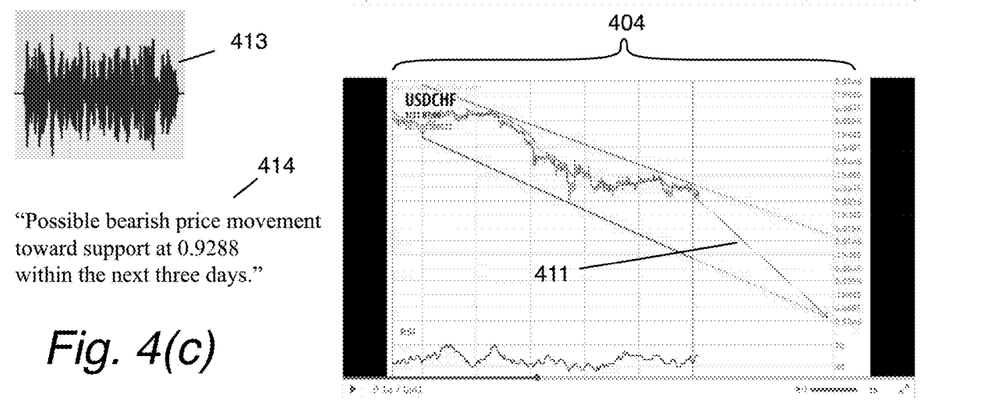

FIGS. 4(a) through 4(c) provide an example of a market analysis video produced from technical analysis of a trading data of a financial instrument.

A first image segment 400, illustrated in FIG. 4a presents an introductory concept using an image sequence, which includes the display of the Swiss Franc to US Dollar symbol (USDCHF) 401 and trading data 403 for a period preceding the present time, in this example 07:00 on Jan. 31, 2018. The image segment 400 may be described using a text segment 406. The text segment 406 is used to create a corresponding audio segment 405 automatically. Thus, the image segment 400 is accompanied by an audio segment 405 that is a digital audio representation of the text segment 406 "Today's latest FOREX Report, Jan. 31, 2018. Swiss Franc." Thus, the introductory concept has associated therewith an image segment 400, an audio sequence 405, and a text segment 406.

In the example of FIG. 4a, the audio segment 405 is six seconds long. Therefore, the image segment 400 is made also to be six seconds long. On the other hand, had the audio been rendered in another language, the audio segment may be shorter or longer. In such an instance, the image segment 400 would be made to correspond to the length of such shorter or longer audio segment.

A subsequent image segment 402, which is approximately 4 seconds long and which is illustrated in FIG. 4b, corresponds to the concept of an identified pattern, namely, a channel down, includes an image sequence that depicts the identified channel 407 added to the image sequence that makes up image segment 400 (of the introductory concept) and is accompanied by an audio segment 409 that is a digitized audio stream corresponding to the text segment 410 "channel down identified at 7 o'clock."

A subsequent image segment 404, illustrated in FIG. 4c, corresponds to a prediction concept, displays in an image sequence corresponding to the prediction, a prediction graphic 411 added to the image that constitutes image sequence 402 and is accompanied by an audio segment 413 that is a digitized audio stream corresponding to the text segment 414 "possible bearish price movement toward support at 0.9288 within the next three days."

It should be noted that in FIGS. 4a-4c image sequences 400, 402, and 404 are depicted as single images. In implementations, the image sequences are a plurality of images displayed sequentially.

Each of the image segments is associated with a corresponding audio segment thereby producing a video segment (wherein the nomenclature video segment is used to connote a combination of an audio segment and a corresponding image segment). These video segments are then combined to produce one video stream, which may be delivered to a user.

Returning to FIG. 1, the market-commentary server 115, i.e., the server that produces market-commentary videos such as the video streams illustrated in FIGS. 4a through 4c, may store the market-commentary video streams 117 in a market-commentary-videos database 119. The market-commentary server 115 may further provide 121 the market-commentary videos 117 to an aggregator 123, for example, an online broker operating a broker server. The aggregator 123 may provide the commentary videos to a user 125 as part of a webpage 127 provided by the aggregator to the user 125. The user 125 may then view the video in a browser 127 viewable on the user's computer 129.

While the financial-market exchange 101, the market-analysis server 109, the market-commentary server 115, and the broker server 123 are depicted as distinct entities, one or more of these servers may be combined, for example, the market-analysis server 109 and the market-commentary server 115 are closely related functions that can advantageously operate on one server or servers operated by one commercial entity.

Figure 5:
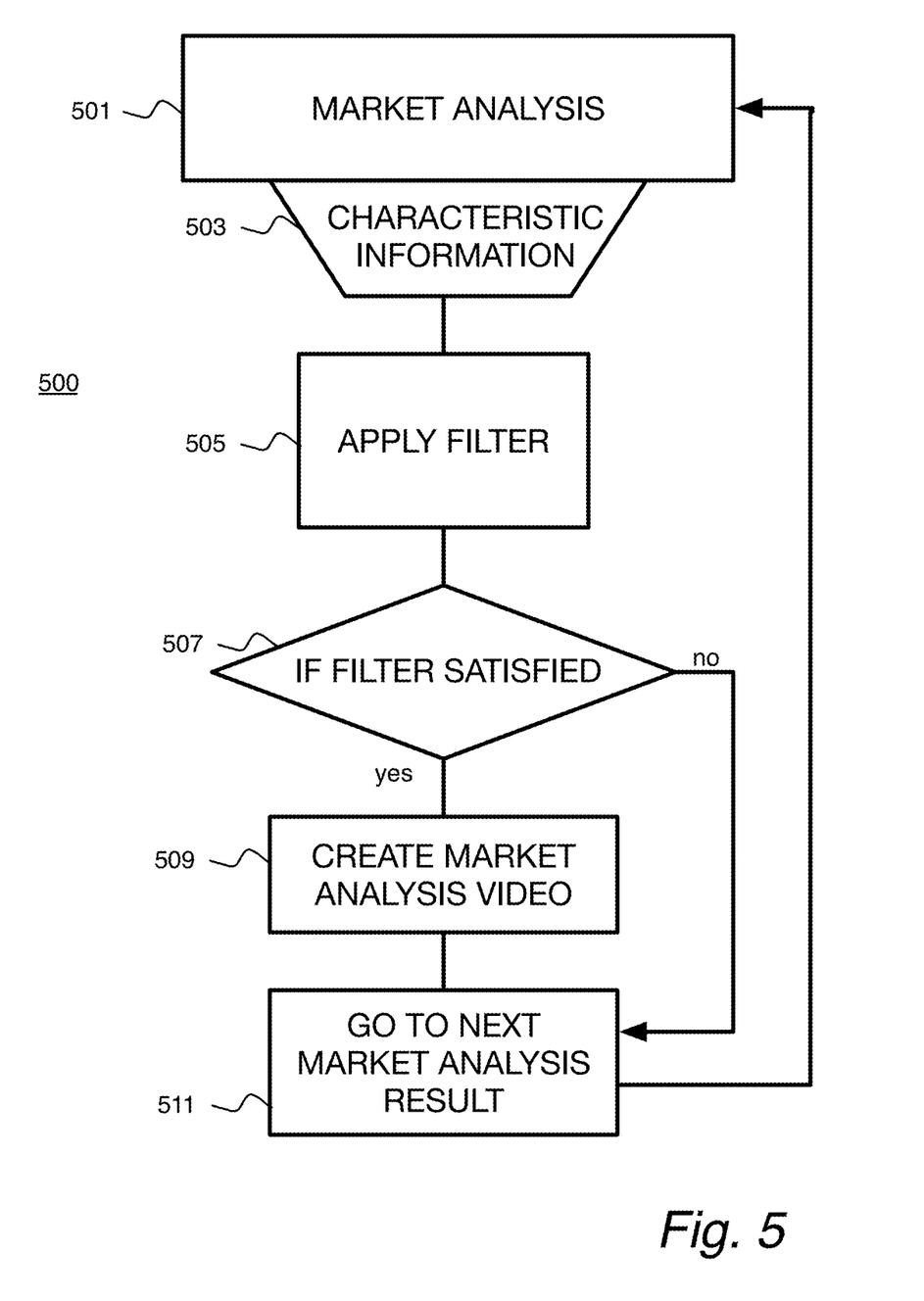
FIG. 5 is a flowchart illustrating a process including the application of a filter to decide whether to produce market analysis videos from market analysis results.

In an embodiment, not all market analysis results are used to produce market analysis video streams. FIG. 5 is a flowchart illustrating a process 500 including the application of a filter to decide whether to produce market analysis videos from market analysis results.

As described hereinabove, a market analysis is performed on financial instrument trading data and other economic data, step 501. The market analysis 501 produces some characteristic information 503 describing market-analysis results.

A filter 505 is applied to the characteristic information 503.

Some examples of filters include:
When the market movement is sufficiently large to warrant a news event, e.g., the NYSE drops over a percentage threshold such as by more than 2%.
When there is an expectation that a particular currency will strengthen by over a threshold percentage, e.g., by 2%, in one day due to a Federal Reserve Board interest rate decision.
When indications are that a particular instrument is overvalued by a threshold, e.g., by four percentage points.

If the filter condition is satisfied 507, a market-analysis video is created 509 in the manner described hereinabove and in further detail hereinbelow.

Otherwise, i.e., if the filter condition 507 is not satisfied, no market-analysis video is created for the market-analysis result.

The process then proceeds to the next market-analysis result, step 511. As trading data are continuously produced by exchanges, market-analysis results are also continuously produced. Therefore, there is a never-ending stream of analysis results that may be filtered to determine the suitability for producing market-analysis videos.

Figure 6:
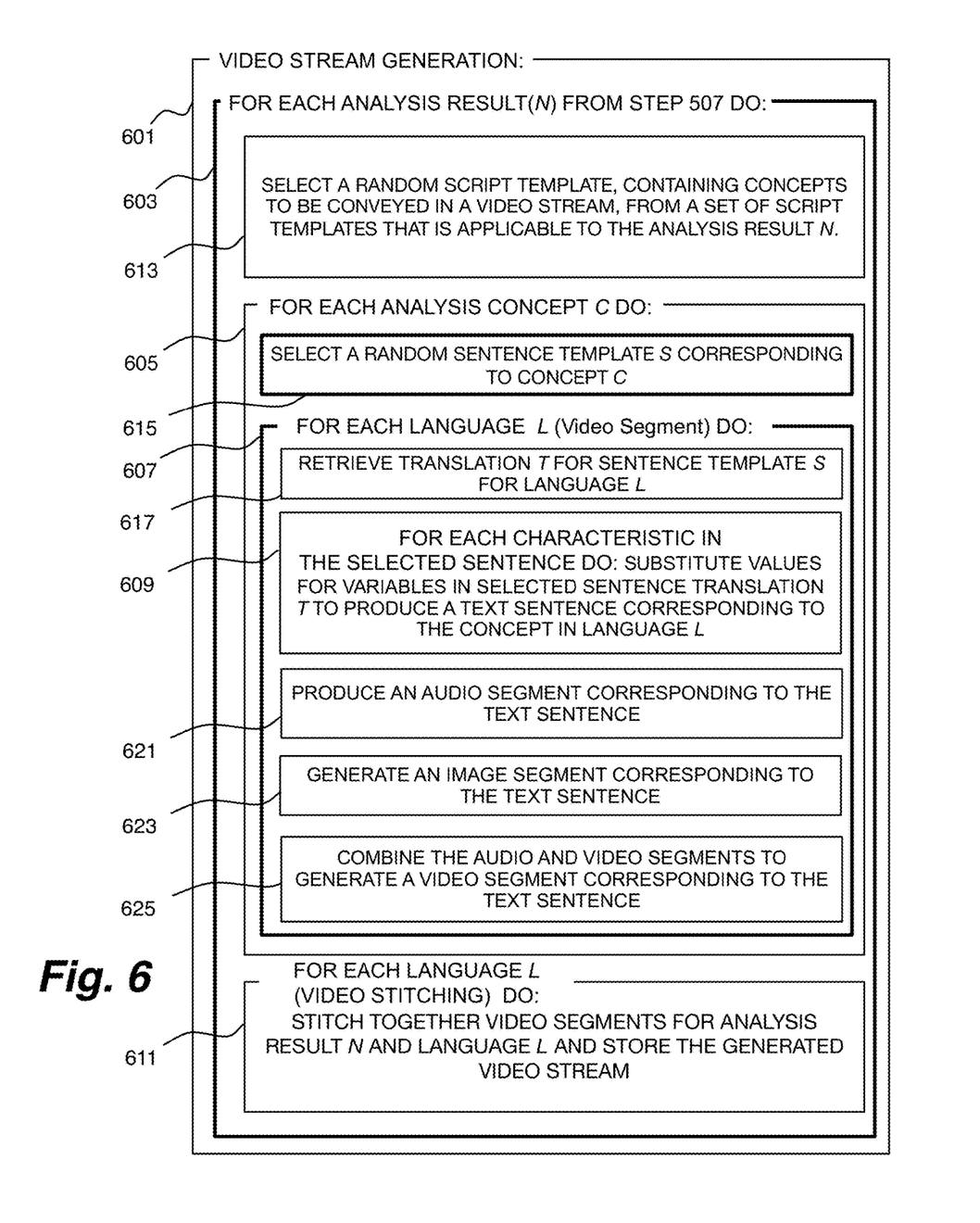
FIG. 6 is a flowchart illustrating steps performed to transform a financial market analysis result into video streams, e.g., market commentary videos.

FIG. 6 is a flowchart illustrating steps performed to transform a financial market analysis result into video streams, e.g., market-commentary videos 117 such as those depicted in FIGS. 4(*a*) through FIG. 4(*c*) for multiple languages; specifically for analysis results that pass through the filter steps 505 and 507 FIG. 5. In a sense, the video-stream generation process 601 corresponds to step 509 of FIG. 5.

Figure 7:
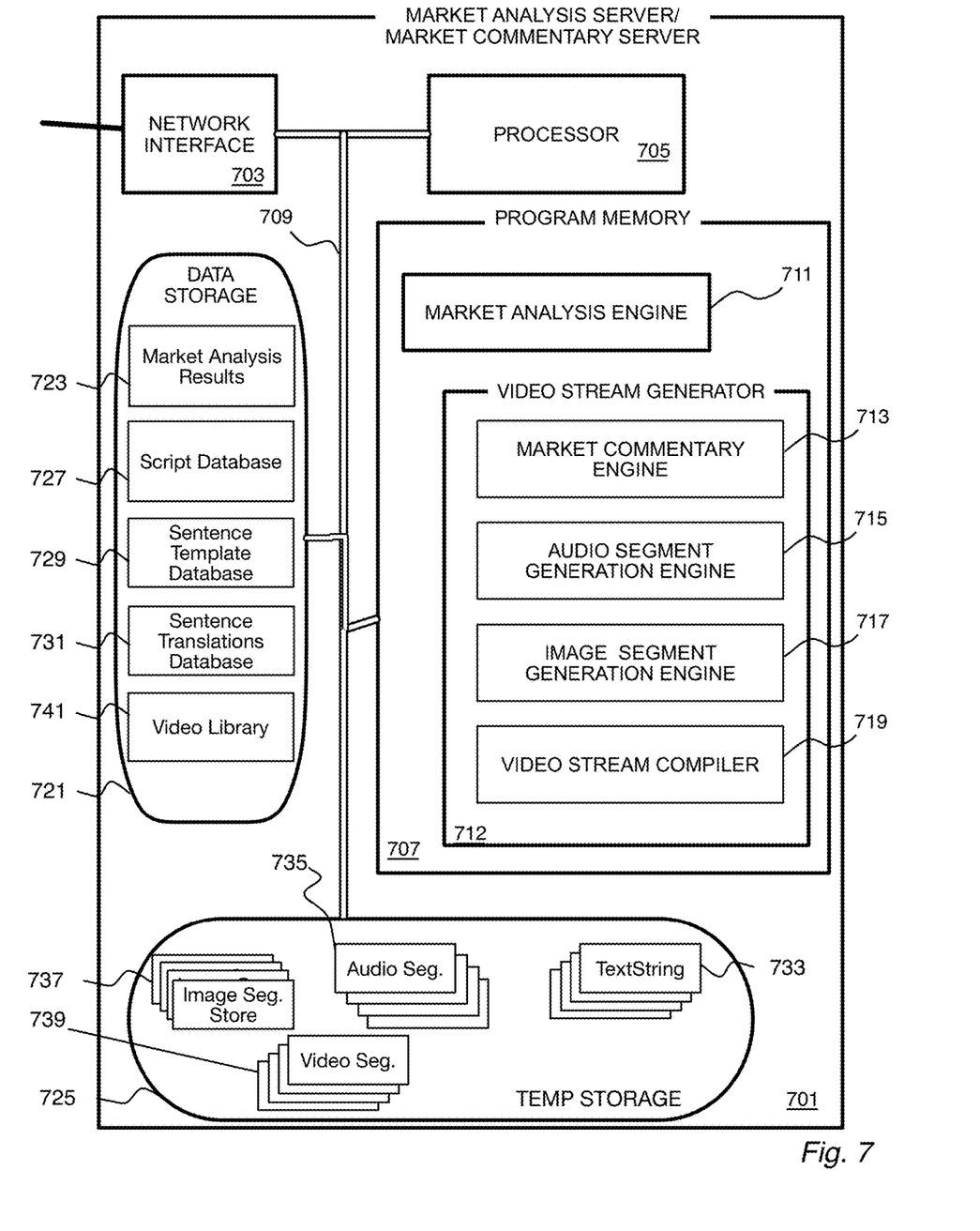
FIG. 7 is a block diagram of a hardware and software architecture for a combined market analysis server and market commentary server 701, for example, corresponding to the market analysis server 109 and the market commentary server 115 of FIG. 1 and executing the process of FIGS. 5 and 6.

FIG. 7 is a block diagram of a hardware and software architecture for a combined market-analysis server and market commentary server 701, for example, corresponding to the market-analysis server 109 and the market-commentary server 115 of FIG. 1. FIG. 7 is described in greater detail hereinbelow and in conjunction with the description of FIG. 6.

The combined market-analysis-and-commentary server 701 has a network interface 703 for connecting, for example, the Internet (e.g., the Internet 100 of FIG. 1), a processor 705 for executing programs stored in a program memory 707. The processor 705 may be connected to the network interface 703 and program memory 707 via a bus 709.

The program memory 707 contains a market-analysis engine 711, a video-stream generator 712, which includes a market-commentary engine 713, an audio-segment generation engine 715, an image-segment generation engine 717, and a video-stream compiler 719. These modules include instructions for the processor 705 to perform tasks associated with the methods for producing market commentary videos as described in conjunction with FIG. 6 and elsewhere herein.

The market-analysis engine 711, which corresponds to method step 501 of FIG. 5, may perform one or more types of trading-data analysis from trading data received via the network interface 703. The market-analysis engine 711 may store market-analysis results 723 in a data store 721, which is also connected to the processor 705. The data store 721 holds relatively permanent data and is therefore ideally located on a hard disk, EEPROM, flash memory, or some analogous semi-permanent storage device.

The video-stream generator 712, corresponds, for example, to the video stream-generation method 601 of FIG. 6. As such, the video-stream generator 712 creates video streams for market-analysis results in one or more languages; the method for which is described in greater detail hereinbelow.

The video-stream generator 712 contains instructions to create textual descriptions, image segments, and audio segments of the market-analysis results produced by the market-analysis engine 711 resulting in graphical-image segments and corresponding textual and audio segments illustrating and describing the market-analysis results. The image segments, audio segments, and textual descriptions may be stored in a temporary data storage 725. Because of the temporary nature of the data items stored therein, the temporary data storage maybe RAM. However, due to size constraints or processing concerns, the temporary data storage 725 may be a permanent storage device, e.g., a hard disk or flash memory.

Returning now to the process 601 illustrated in FIG. 6; the process 601 consists of several nested loops:
The outer-loop is the Each analysis result loop 603, which loops over each analysis result that has passed through the filter mechanism discussed in conjunction with FIG. 5. If the filter mechanism of FIG. 5 is applied, the analysis results processed by loop 603 are those analysis results that satisfied the filter condition 507. The Each analysis result loop 603 selects a video stream script for a video-stream to be produced to illustrate and describe an analysis result. A script contains a sequence of concepts to be illustrated and described in the video stream corresponding to one financial-analysis result. Concepts include such matters as identifying the financial instrument concerned, the type of analysis pattern identified, and prediction for future trading trends.
The Each analysis concept loop 605, which loops over the concepts in an analysis result as identified in the selected script and that are to be conveyed in the video stream produced for the analysis result and selects a sentence template for a concept being processed by the loop. Sentence templates are text strings with variables corresponding to pieces of characteristic information.

The Each language (video segment) loop 607, which loops over all the languages for which analysis-result videos are to be produced to produce a video segment for each analysis concept in the selected script.

The Each characteristic loop 609 (nested in the Each language segment (video segment) loop 607), which loops over pieces of characteristic information identified by variables in the selected sentence template and produces a text sentence in the language L being processed by the Each language (video segment) loop 607 with values for the characteristic information from the analysis result.

The Each language (Video Stitching) loop 611, which loops over the languages for which market analysis videos are to be produced and stitches together the video segments produced in the Each language segment (video segment) loop 607 thereby producing analysis result video streams in each language.

The outermost loop of the video stream generation process 601 is the Each analysis result loop 603. For each analysis result N that passes the filter 505 of FIG. 5, the loop prepares a market analysis video stream for each of several languages.

For each analysis result N, the video stream generation process 601 selects a script corresponding to the analysis result N, step 613. As discussed hereinabove, market analysis encompasses several types of financial instrument analysis, including, Technical Analysis, Statistical Analysis, Macroeconomic Analysis, Fundamentals Analysis, and Volatility and Risk Analysis. For each such type of analysis result, a Script Database 727 (stored in the data storage 721 of a market analysis server 701) contains one or more scripts, any of which may be applicable to a particular analysis result.

Each script contains one or more sentence templates, which in turn contain a plurality of variables that correspond to characteristic information values. Thus, applicable scripts may be those that (1) correspond to the analysis type and (2) for which the analysis result contains values for the required characteristic information variables.

Grammatically, a script is a sequence of concept descriptions. A concept description is a sequence of text strings and variables.

For example, consider the example of FIGS. 4(*a*) through 4(*c*). A first possible script contains three concepts:
<exchange-symbol><pattern-time><forecast-target-period>

Another possible script for technical analysis is:
<exchange-symbol><forecast><pre-requisite condition for forecast>

Having multiple scripts associated with an analysis type allows for variety in the video streams that are produced by the market analysis server 701. Accordingly, in an embodiment, the script database 727 contains multiple script templates for each analysis type and the step 613 includes randomly selecting a script template from the set of applicable script templates.

Having selected a script template, which contains several concepts, the Each analysis concept loop 605—which loops over all the concepts identified in the selected script—is executed.

As a preliminary step, for each concept one or more sentence templates are stored in a sentence database 729 of the data storage 721.

Consider, for example, the example of FIG. 4*a*: the exchange-symbol concept calls for identification of an exchange, the date of the report, and a symbol identifier. A few possible sentences for that concept are:

"Today's latest" <exchange> "report," <resultDate> "." <symbol > "."
<resultDate>. "Report for" <exchange> "." <symbol > "."
<resultDate>. <exchange> "report for" <symbol > "."

Each of <exchange>, <resultDate>, <symbol> are variables that correspond to pieces of characteristic information. In the example of FIGS. 4(*a*), <exchange> corresponds to "FOREX" and <resultDate> corresponds to the date stamp of the analysis—here, "Jan. 31, 2018".

Thus, the three sentences would expand, respectively, into:

"Today's latest FOREX report, Jan. 31, 2018. Swiss Franc."
"Jan. 31, 2018. Report for FOREX. Swiss Franc."
"Jan. 31, 2018. FOREX report for Swiss Franc."

By providing multiple sentences for a concept, it is possible to randomize the generation of the video stream, thereby producing variation in the final video stream output from the market analysis server 701.

Accordingly, the Each analysis concept loop 605 contains a step 615 to select a random sentence template S corresponding to the concept C being processed.

Video streams are produced for multiple languages. Accordingly, the selected sentence template S is processed into video segments for each language for which video streams are to be produced. This processing is performed by a loop that iterates over each language for which a video stream is to be produced for the analysis result, the Each language segment (video segment) loop 607.

As a preliminary step, translations are created for each sentence template stored in the sentence template database 729. These translations are stored in a Sentence Translations database 731 of the data storage 721.

As an example, the three example sentences provided above would be stored in Russian as:

"Сегодняшний"<exchange> "отчет" <resultDate> "." <symbol> "."
<resultDate>. "отчет для" <exchange> "." <symbol > "."
<resultDate>. <exchange> "отчет для" <symbol > "."

Accordingly, for each loop, processing the analysis concept C for the language L, the Each language (video segment) loop 607 retrieves the translation T of sentence template S for language L from the Sentence Translations database 731, step 617.

As noted above, each sentence template contains one or more characteristics information variables into which the video stream generation process 601 substitutes actual values for each characteristic information in the sentence template S from the analysis result N being processed by the Each analysis result loop 603, the Each characteristic loop 609.

Thus, considering the example of FIG. 4*a*, the sentence template in that example is:
" Today's latest " <exchange>"report," <resultDate>"." <symbol-expand>"."which after the value substitutions of Step 619 results in the text sentence:
"Today's latest FOREX Report, Jan. 31, 2018. Swiss Franc."

It should be noted that the script template may also contain sentences without any characteristic information, for example, for general information that is not directly linked to a specific analysis result. Such sentences would not be processed by the Each characteristic loop 609.

Examples of such sentences for a technical analysis that has identified a "breakout" condition include:

"If you're a trend trader then you may see this event as a sign of a longer term trend, but most swing traders would argue that markets don't only move in one direction and one should expect a correction."

"The swing traders among you may be expecting a pull-back after this movement, but trend traders may be expecting an even bigger move."

"A move of this nature could signal either a start of a larger trend, or prompt a short term reversal."

The corresponding sentences in Russian:

"Если вы трейдер трендов, вы можете увидеть это событие как признак долгосрочного тренда, но большинство трейдеров- поворотников будут утверждать, что рынки не только движутся в одном направлении и следует ожидать коррекции"

"Поворот трейдеров среди вас может ожидать отступления после этого движения, но трейдеры тренда могут ожидать еще большего движения"

"Такое движение могло бы сигнализировать о начале более крупной тенденции или вызвать кратковременное изменение"

While not strictly necessary for the production of video streams, the text sentence may be stored in a text data structure 733, for example, in a temporary storage area 725. Storing the text sentences facilitates adding the text as an additional graphic to an image segment, thereby providing for closed captioning of generated video streams.

Audio segments are generated from text sentences, step 621, using a text to voice generator, for example, Amazon Polly from Amazon Web Services, Inc. Thus, this step produces an audio segment, for example, in the manner of the audio segment 405 of the example of FIG. 4*a*. The generated audio segment is stored in as an audio file 735 in the temporary storage 725. Audio segment generation, step 621, is performed by the audio segment generation engine 715.

Further, the video stream generation process 601 generates an image corresponding to the concept C being processed by the Each analysis concept loop 605. The image may be an entirely new image, e.g., image 400 of FIG. 4(*a*). That would usually be the case for the first image segment in a video stream. Alternatively, the image may be an image that adds a new graphical element to the image associated with the preceding image segment, e.g., in the manner of image 402 of FIG. 4(*b*) in which the graphic 407 illustrative of the identified channel is added to the image 400 of FIG. 4(*a*).

The created image is converted into an image segment, which displays the image for a duration equal to the duration of the audio segment, step 623. For example, if the audio segment 405 has a duration of 6.2 seconds, the corresponding image segment is made to also have a duration of 6.2 seconds.

The generated image segment is stored as an image segment file 737 in the temporary storage 725.

Image creation and image segment creation of step 623 are performed by the image-segment generation engine 717.

The process 601 combines the image segment and the audio segment into a video segment, Step 625. A video segment is defined herein as a structure that contains an image segment and a corresponding audio segment.

The process 601 stores the video segment as a video file 739 in the temporary storage 725.

When the Each language (Video Segment) loop 607 has processed all languages, the Each analysis concept loop 605 processes the next concept, e.g., for the example of FIG. 4, the process moves on to the <pattern-time> concept, which in FIG. 4(*b*) is the identification and description of the channel 407. Subsequently, the Each analysis concept loop 605 advances to the <forecast-target-period> concept, i.e., the illustration and description of the forecast based on the identified pattern as illustrated in FIG. 4(*c*).

When all concepts have been processed by the Each analysis concept loop 605, the process moves to stitching together the video segments produced by the loop 605, step 611. The stitching step 611 loops over all languages L for which video segments were created by the Each language (Video Segment) loop 607 and retrieves the video segments 739 that correspond to the analysis result N (and language L) from the temporary storage 725. These video segments 739 are then appended to each other in the order of the script template selected in step 613.

The generated market commentary video streams for analysis result N and language L are stored in a video library 741 of the data storage 721. From the video library 741, the market commentary video streams (corresponding to video streams 127 of FIG. 1) may be served to consumers, e.g., to a broker server 123 as illustrated in FIG. 1, data stream 121.

Figure 8:
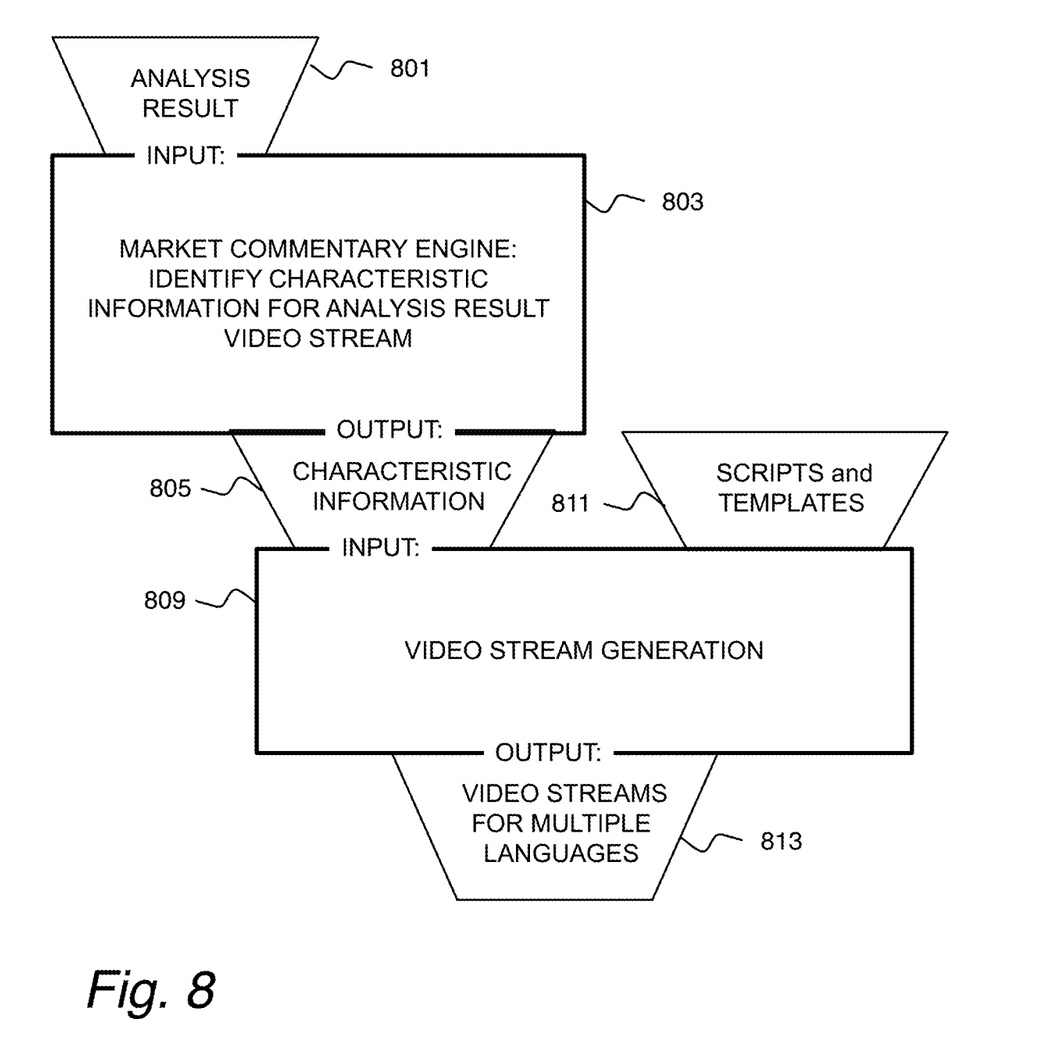
FIG. 8 is a data flow diagram providing an alternative view of the process and mechanisms FIG. 5 through FIG. 7.

FIG. 8 is a data flow diagram providing an alternative view of the process and mechanisms described hereinabove. Market analysis results 801 are input to a market commentary engine 803. These data analysis results are used to identify characteristic information that are suitable for video stream production. The market commentary engine 803 outputs subset of characteristic information 805 that is useful for the video stream production. A video stream generator 809 inputs the characteristic information 805 as well as scripts and templates 811. Using the scripts and templates and the characteristic information, the video stream generator 809 produces video streams 813 for multiple languages.

The video stream generator 809 operates according to the principles of FIGS. 6 and 7 to generate audio segments that correspond to image segments that correspond to addition of graphical elements to an image displayed in a video stream presentation of market analysis results.

A person skilled in the art will realize that the description above is merely one embodiment of the technology disclosed herein. Database tables may, for example, be organized in a different fashion.

From the foregoing it will be apparent that a technology has been presented which provides for a flexible, scalable, and economical mechanism for producing multi-language market commentary videos that may be disseminated to users in many ways.

Although specific embodiments of the invention have been described and illustrated, the invention is not to be limited to the specific forms or arrangements of parts so described and illustrated. The invention is limited only by the claims.

APPENDIX A

Technical Analysis

Characteristic information fields from technical analysis of trading data for a financial instrument that may be used to produce multi-language market commentary videos streams.

| Field | Level | Type | Description |
| --- | --- | --- | --- |
| resultID | | Integer | Unique identifier of the pattern |
| pattern | Secondary | String | The name of the pattern type |
| symbol | Primary | String | The symbol this result belongs to. |
| exchange | Primary | String | The exchange the instrument belongs to. |
| direction | Primary | Integer | The direction of the pattern, 1 is up, −1 is down. |
| initialtrend | Secondary | Integer | The trend of the start of the pattern ranging from 1 to 10. |
| interval | Secondary | Integer | The time granularity (in minutes) of the result. |
| uniformity | Secondary | Integer | Even spacing of the turning points that touch support and resistance lines, ranging from 1 to 10. |
| clarity | Secondary | Integer | The level of "noise" in the price graph-more spiky price movements mean a lower clarity score, ranging from 1 to 10. |
| breakout | Secondary | Integer | Momentum with which the price broke through the support or resistance level, ranging from 1 to 10. |
| completed | Primary | Integer | Whether the pattern is completed or emerging (0 for emerging, 1 for completed). |
| resultDate | Primary | Timestamp | Time of pattern identification. Represented as an Epoch timestamp. |
| resistancex0 | | Timestamp | The first time-point of the pattern resistance line. Represented as an Epoch timestamp |
| resistancey0 | | Double | The first price-point of the pattern resistance line. |
| resistancex1 | | Timestamp | The last time-point of the resistance line of the pattern. Represented as an Epoch timestamp |
| resistancey1 | | Double | The first price-point of the pattern resistance line. |
| supportx0 | | Timestamp | The first time-point of the support line of the pattern. Represented as an Epoch timestamp |
| supporty0 | | Double | The first price-point of the pattern resistance line. |
| supportx1 | | Timestamp | The last time-point of the support line of the pattern. Represented as an Epoch timestamp |
| supporty1 | | Double | The first price-point of the pattern resistance line. |
| volumeIncrease | Secondary | Double | The increase of volume traded during the pattern length. |
| stopLoss | | Double | A possible stop loss level, calculated based on statistics. |
| predictionpricefrom | Secondary | Double | The bottom price of the prediction area. This value is only set if the pattern is a completed pattern. |
| predictionpriceto | Secondary | Double | The top price of the prediction area. This value is only set if the pattern is a completed pattern. |
| predictiontimefrom | | Timestamp | The youngest time (left side) of the prediction area. Represented as an Epoch timestamp. This value is only set if the pattern is a completed pattern. |

APPENDIX A-continued

Technical Analysis

Characteristic information fields from technical analysis of trading data for a financial instrument that may be used to produce multi-language market commentary videos streams.

| Field | Level | Type | Description |
|---|---|---|---|
| predictiontimeto | | Timestamp | The oldest time (right side) of the prediction area. Represented as an Epoch timestamp. This value is only set if the pattern is a completed pattern. |
| quality | Secondary | Integer | The quality of the pattern ranging from 1 to 10. |
| trend | Secondary | String | The trend type, Reversal or Continuation. |
| length | Secondary | Integer | The length in bars/candles of the pattern. |

APPENDIX B

Fundamental Analysis

List of example characteristics for Fundamental Analysis

| | |
|---|---|
| Exchange | the name of the bourse. eg: NYSE |
| Sector | the sector to which the instrument belongs. eg, Services |
| Industry | the industry to which the instrument belongs. eg, Department Store |
| Symbol | the ticker, eg. M (Macys, Inc) |
| ValuationDate | the date of the latest valuation performed. Typically the date of the latest release of financial statements. eg Apr. 4, 2018 |
| PriceAtValuationDate | the price of the stock at the date of valuation. eg $30.09 |
| CurrentPrice | the latest price of the stock, eg. $35.56 |
| Graham | the valuation based on Graham Ketselson method. eg. $35 |
| EBIT | the valuation based on EBIT valuation method. eg. $38 |
| DCF | the valuation based on Discounted Cash Flow method. eg. $32 |
| PE | the valuation based on PE method. eg: $33 |
| AverageValuation | average of above valuations, eg. $34.50 |
| ValueDiff_percent | the difference between the current stock price and the average valuation, in percent. eg. 2.98% over-valued |
| ValuationAge | how long ago the valuation was done, in days. eg. 58 days ago |

APPENDIX C

Macroeconomic analysis

List of example characteristics for Macroeconomic Analysis

| | |
|---|---|
| country | the country where the news event is taking place, e.g., US |
| name | the name of the event, e.g., Employment Situation |
| release_date | the event time, e.g., Jun. 1, 2018, 8:30 am ET |
| items | a list of available trading opportunities for this event.... |
| sample_size | the amount of history events taken into consideration for this forecast, e.g., 12 |
| time_frame | the length of the forecast trend, e.g., 2 hours |
| symbol | the name of the instrument being forecast, e.g., EUR/USD |
| delta_gt_up | probability that the trend is positive if actual > consensus, e.g., 0.55 |
| delta_lt_up | probability that the trend is positive if actual < consensus, e.g., 0.70 |
| delta_eq_up | probability that the trend is positive if actual = consensus, e.g., 0.45 |
| delta_gt_down | probability that the trend is negative if actual > consensus, e.g., |

(there is a one to many relationship: one event with multiple forecasts for that event)

The invention claimed is:

1. A method for operating a market analysis computer to produce a financial market trading data video stream, comprising:

receiving a financial market analysis result having an analysis type;

selecting a plurality of sentence templates corresponding to the analysis type from a set of sentence templates, wherein a sentence template comprises a combination of at least one text string and at least one characteristic-information variable;

retrieving translations of the selected plurality of sentence templates for at least one language;

for each language of said at least one language:
substituting characteristic-information data from said financial market analysis result for each said characteristic-information variable, thereby producing a sentence text-string corresponding to said each language and said translation of the selected sentence-template;
creating an audio segment corresponding to each said sentence text-string;
creating an image segment corresponding to said audio segment, such that said audio segment and said image segment have equal duration; and
creating a video segment by combining said audio segment and image segment; and
for each language of said at least one language:
stitching together said video segments thereby producing a financial market trading data video stream for said financial market analysis result.

2. The method of claim 1, further comprising repeating the method for each of a plurality of additional financial market analysis results.

3. The method of claim 1 further comprising:
selecting one of a plurality of video-stream scripts corresponding to the analysis type, wherein a video-stream script comprises a plurality of concept descriptions;
wherein the step of selecting a sentence templates comprises selecting a sentence-template from a set of sentence-templates that correspond to each concept description in the selected video-stream script.

4. The method of claim 1 wherein the step of creating an image segment comprises:
creating an image including a graphic representation corresponding to the characteristic information of the analysis result and corresponding to the selected sentence template; and
repeating the created image to create a sequence of images, thereby producing an image segment.

5. The method of claim 1, wherein the analysis is selected from a group consisting essentially of technical analysis, statistical analysis, macro-economic analysis, fundamental analysis, and volatility and risk analysis.

6. The method of claim 1, wherein the analysis is technical analysis and the at least two pieces of characteristic information is a trading pattern.

7. The method of claim 6, wherein the trading pattern is selected from the group consisting essentially of triangles, head-and-shoulders, rising and falling channels, rising and falling wedges, ascending and descending triangles, double tops and bottoms, triple tops and bottoms.

8. A financial market analysis computer server, comprising:
a processor and a program storage for storing program instructions to cause the processor to create a financial market analysis video stream by:
receiving a financial market analysis result having an analysis type;
selecting a plurality of sentence templates corresponding to the analysis type from a set of sentence templates, wherein a sentence template comprises a combination of at least one text string and at least one characteristic-information variable;
retrieving translations of the selected plurality of sentence templates for at least one language;
for each language of said at least one language:
substituting characteristic-information data from said financial market analysis result for each said characteristic-information variable, thereby producing a sentence text-string corresponding to said each language and said translation of the selected sentence-template;
creating an audio segment corresponding to each said sentence text-string;
creating an image segment corresponding to said audio segment, such that said audio segment and said image segment have equal duration; and
creating a video segment by combining said audio segment and image segment; and
for each language of said at least one language:
stitching together said video segments thereby producing a financial market trading data video stream for said financial market analysis result.

9. The financial market analysis computer server of claim 8, the program instructions further comprise instructions to cause the processor to repeating the method for each of a plurality of additional financial market analysis results.

10. The financial market analysis computer server of claim 8 the program instructions further comprise instructions to cause the processor to perform the steps:
selecting one of a plurality of video-stream scripts corresponding to the analysis type, wherein a video-stream script comprises a plurality of concept descriptions;
wherein the step of selecting a sentence templates comprises selecting a sentence-template from a set of sentence-templates that correspond to each concept description in the selected video-stream script.

11. The financial market analysis computer server of claim 8 wherein the step of creating an image segment comprises:
creating an image including a graphic representation corresponding to the characteristic information of the analysis result and corresponding to the selected sentence template; and
repeating the created image to create a sequence of images, thereby producing an image segment.

12. The financial market analysis computer server of claim 8, wherein the analysis is selected from a group consisting essentially of technical analysis, statistical analysis, macro-economic analysis, fundamental analysis, and volatility and risk analysis.

13. The financial market analysis computer server of claim 8, wherein the analysis is technical analysis and the at least two pieces of characteristic information is a trading pattern.

14. The financial market analysis computer server of claim 13, wherein the trading pattern is selected from the group consisting essentially of triangles, head-and-shoulders, rising and falling channels, rising and falling wedges, ascending and descending triangles, double tops and bottoms, triple tops and bottoms.

15. A non-transitory machine-readable storage medium having stored thereon a computer program for producing a financial-market trading-data video stream, comprising instructions to perform the steps:
receiving a financial market analysis result having an analysis type;
selecting a plurality of sentence templates corresponding to the analysis type from a set of sentence templates, wherein a sentence template comprises a combination of at least one text string and at least one characteristic-information variable;
retrieving translations of the selected plurality of sentence templates for a at least one language;
for each language of said at least one language:

substituting characteristic-information data from said financial market analysis result for each said characteristic-information variable, thereby producing a sentence text-string corresponding to said each language and said translation of the selected sentence-template;

creating an audio segment corresponding to each said sentence text-string;

creating an image segment corresponding to said audio segment, such that said audio segment and said image segment have equal duration; and creating a video segment by combining said audio segment and image segment; and for each language of said at least one language:

stitching together said video segments thereby producing a financial market trading data video stream for said financial market analysis result.

16. The non-transitory machine-readable storage medium of claim 15, the computer program further comprising instructions for repeating the method for each of a plurality of additional financial market analysis results.

17. The non-transitory machine-readable storage medium of claim 15, the computer program further comprising instructions for:

selecting one of a plurality of video-stream scripts corresponding to the analysis type, wherein a video-stream script comprises a plurality of concept descriptions;

wherein the step of selecting a sentence templates comprises selecting a sentence-template from a set of sentence-templates that correspond to each concept description in the selected video-stream script.

18. The non-transitory machine-readable storage medium of claim 15 wherein the step of creating an image segment comprises:

creating an image including a graphic representation corresponding to the characteristic information of the analysis result and corresponding to the selected sentence template; and repeating the created image to create a sequence of images, thereby producing an image segment.

19. The non-transitory machine-readable storage medium of claim 15 wherein the analysis is selected from a group consisting essentially of technical analysis, statistical analysis, macro-economic analysis, fundamental analysis, and volatility and risk analysis.

20. The non-transitory machine-readable storage medium of claim 15 wherein the analysis is technical analysis and the at least two pieces of characteristic information is a trading pattern.

21. The non-transitory machine-readable storage medium of claim 20 wherein the trading pattern is selected from the group consisting essentially of triangles, head-and-shoulders, rising and falling channels, rising and falling wedges, ascending and descending triangles, double tops and bottoms, triple tops and bottoms.

* * * * *